United States Patent
Lu et al.

(10) Patent No.: US 9,032,759 B2
(45) Date of Patent: May 19, 2015

(54) FLUID APPLICATOR AND GLASS CLEANING PROCESS

(75) Inventors: Chih Yuan Lu, Gangshan Township, Kaohsiung County (TW); Chia Hsien Wu, Chiayi (TW)

(73) Assignee: Corning Incorporated, Corning, NY (US)

(*) Notice: Subject to any disclaimer, the term of this patent is extended or adjusted under 35 U.S.C. 154(b) by 419 days.

(21) Appl. No.: 13/027,508

(22) Filed: Feb. 15, 2011

(65) Prior Publication Data

US 2011/0197632 A1    Aug. 18, 2011

Related U.S. Application Data

(60) Provisional application No. 61/305,250, filed on Feb. 17, 2010.

(51) Int. Cl.
*C03C 23/00* (2006.01)
*B08B 3/02* (2006.01)

(52) U.S. Cl.
CPC ............ *B08B 3/022* (2013.01); *C03C 23/0075* (2013.01)

(58) Field of Classification Search
CPC .................................................. C03C 23/0075
USPC .............................. 65/62, 111; 134/15, 122 R
See application file for complete search history.

(56) References Cited

U.S. PATENT DOCUMENTS

| | | | |
|---|---|---|---|
| 2,357,695 A | 9/1944 | Skowron | 29/81 |
| 3,543,775 A | 12/1970 | Bodner | 134/64 |
| 3,760,824 A * | 9/1973 | Edwards et al. | 134/144 |
| 3,793,054 A | 2/1974 | Franz | 117/47 |
| 4,832,752 A * | 5/1989 | Nezworski | 134/22.12 |
| 5,758,530 A | 6/1998 | Yoshikawa et al. | 72/40 |
| 5,924,305 A | 7/1999 | Hill | |
| 6,092,392 A * | 7/2000 | Verlinden et al. | 65/30.1 |
| 6,161,874 A * | 12/2000 | Yang | 285/12 |
| 6,301,930 B1 * | 10/2001 | Warner et al. | 65/27 |

(Continued)

FOREIGN PATENT DOCUMENTS

| CN | 202070433 | 12/2011 | |
|---|---|---|---|
| JP | 62-47492 | 3/1987 | C23G 1/14 |

(Continued)

OTHER PUBLICATIONS

The State Intellectual Property Office of The People's Republic of China; Search Report; Mail Date Dec. 5, 2013; pp. 1-2.

(Continued)

*Primary Examiner* — Cynthia Szewczyk
(74) *Attorney, Agent, or Firm* — Jeffrey A. Schmidt

(57) ABSTRACT

A fluid applicator (20), for cleaning particles from a glass sheet (2), including a conveyor (40) for supporting the glass sheet, a conveyance plane, and a nozzle (24). The conveyance plane is disposed adjacent the conveyor so that when the glass sheet is conveyed by the conveyor, a surface (6) of the glass sheet is disposed in the conveyance plane. The nozzle has a longitudinal axis (23), wherein the longitudinal axis is disposed at an angle of 30 to 90 degrees with respect to the conveyance plane, and the nozzle is disposed at a distance (21) of less than or equal to 100 mm from the conveyance plane. Also, there is disclosed a method for cleaning particles from a glass sheet, using the fluid applicator. The fluid may be delivered to the nozzle at a pressure of 10 to 80 kg/cm$^2$ and a flow rate of from 1 to 20 l/min.

14 Claims, 5 Drawing Sheets

(56) References Cited

U.S. PATENT DOCUMENTS

| | | | |
|---|---|---|---|
| 6,405,399 B1 | 6/2002 | Farber et al. | 15/77 |
| 7,119,027 B2* | 10/2006 | Ohsawa et al. | 438/748 |
| 7,232,493 B2* | 6/2007 | Misura et al. | 134/6 |
| 8,056,367 B2 | 11/2011 | Kin et al. | 65/165 |
| 2001/0027797 A1* | 10/2001 | Yoshioka et al. | 134/1 |
| 2001/0037819 A1* | 11/2001 | Mitsumori et al. | 134/15 |
| 2003/0217762 A1* | 11/2003 | Kobayashi et al. | 134/2 |
| 2005/0028559 A1* | 2/2005 | Hiromatsu et al. | 65/99.2 |
| 2005/0037628 A1 | 2/2005 | Ohsawa et al. | 438/778 |
| 2005/0056302 A1 | 3/2005 | Misura et al. | 134/6 |
| 2005/0199493 A1 | 9/2005 | Bangert et al. | 204/298.23 |
| 2011/0197632 A1 | 8/2011 | Lu et al. | 65/62 |

FOREIGN PATENT DOCUMENTS

| | | |
|---|---|---|
| JP | H05-009338 | 1/1993 |
| JP | H08-182971 | 7/1996 |
| JP | H11-054891 | 2/1999 |
| JP | 2003-124285 | 4/2003 |
| JP | 2003-320321 | 11/2003 |
| JP | 2004-203668 | 7/2004 |
| WO | 2008/132939 | 11/2008 |

OTHER PUBLICATIONS

Foreign Office Action from JPO—Report Translation from Yanagida & Associates dated Nov. 26, 2014.

* cited by examiner

FLUID APPLICATOR AND GLASS CLEANING PROCESS

This application claims, under 35 U.S.C. 119(e), the benefit of priority of U.S. Provisional Application Ser. No. 61/305,250 filed on Feb. 17, 2010.

FIELD OF THE INVENTION

The present invention is directed to an apparatus for applying fluid to a glass sheet, and a method of cleaning particles off of the glass sheet. More specifically, the present invention is directed to a method and apparatus for applying fluid to a glass sheet in order to clean particles off of the glass sheet.

TECHNICAL BACKGROUND

Because of the increasing refinement in the flat panel display making process, there has been an increasing demand for cleaner and cleaner components. The refinement has been increased to the point where glass sheets used as substrates for display applications, e.g., liquid crystal displays (LCDs) and organic light emitting diode (OLED) displays, now need to have surfaces which are essentially free of defects having dimensions on the order of 1 micron and above. Thus, there is a need to clean very small particles from the surface of a glass sheet that is used as a substrate for the display. Additionally, these glass sheets typically have a thickness of less than or equal to 1.2 mm. Because of the very thin nature of the glass sheet, the typical mindset when performing rinsing operations has been to use high flow rates and low pressures so as not to break the thin glass sheet. While these rinsing operations are suitable for removing detergents and large particles from the glass, they have left much room for improvement when attempting to remove small particles, i.e., on the order of 1 to 50 µm.

SUMMARY

The present disclosure is aimed at an apparatus and method that can effectively clean small particles, i.e., on the order of 1 to 50 µm, from the surface of a glass sheet that has a thickness of less than or equal to 1.2 mm. The inventors have found that small particles very strongly adhere to the glass surface, but can effectively be removed—without increasing the risk of scratching the glass—by carefully controlling a number of fluid-nozzle operating parameters, including: fluid pressure; flow rate; nozzle injecting angle; and distance between the injecting nozzle and the surface of the glass sheet. In fact, the present inventors have found that an arrangement having high pressure and low flow—exactly opposite to the arrangement in the typical glass rinsing operation—very effectively can remove small particles from the surface of a thin glass sheet. And by carefully controlling the above-noted fluid-nozzle operating parameters, there can be avoided breakage of the thin glass sheet.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example, the various features of the embodiments may be combined as set forth in the following aspects.

According to a first aspect, there is provided a method of cleaning particles from a glass sheet, comprising:
supporting a glass sheet;
ejecting fluid from a nozzle toward the glass sheet, wherein the fluid is delivered to the nozzle at a pressure of 10 to 80 $kg/cm^2$ and a flow rate of from 1 to 20 l/min; and
causing relative movement between the glass sheet and the nozzle in a conveyance direction.

According to a second aspect, there is provided the method of aspect 1, wherein the relative movement causes the glass sheet to move relative to the nozzle at a conveying speed of 4 to 6 m/min.

According to a third aspect, there is provided the method of any one of aspects 1 to 2, wherein the nozzle is disposed at a distance of less than 100 mm from the glass sheet.

According to a fourth aspect, there is provided the method of any one of aspects 1 to 3, wherein the glass sheet is less than 1.2 mm thick.

According to a fifth aspect, there is provided the method of any one of aspects 1 to 4, wherein the nozzle has an orifice, and the orifice diameter is 0.2 to 1.0 mm.

According to a sixth aspect, there is provided the method of any one of aspects 1 to 5, wherein:
when the orifice diameter is from 0.3 mm to 0.5 mm, the flow rate is 1 to 5 l/min; and
when the orifice diameter is from 0.9 mm to 1.1 mm, the flow rate is 3 to 20 l/min.

According to a seventh aspect, there is provided the method of any one of aspects 1 to 6, wherein:
the fluid ejected from the nozzle forms a fan angle of 30 to 90 degrees; and
the fluid ejected from the nozzle has an angle of inclination of 30-90 degrees with respect to the glass sheet.

According to an eighth aspect, there is provided the method of any one of aspects 1 to 7, further comprising a plurality of the nozzles, wherein the plurality of the nozzles is disposed in two banks, wherein the banks are disposed at an angle of 30 to 150 degrees with respect to one another, and wherein a centerline of the banks is aligned with or parallel to the conveyance direction.

According to a ninth aspect, there is provided the method of any one of aspects 1 to 7, further comprising a plurality of the nozzles, wherein the plurality of the nozzles is disposed in a bank, and wherein the bank is disposed at an angle of 15 to 75 degrees with respect to a line that is perpendicular to the conveyance direction.

According to a tenth aspect, there is provided the method of any one of aspects 1 to 9, wherein the fluid is deionized water.

According to an eleventh aspect, there is provided the method of any one of aspects 1 to 10, wherein the step of ejecting fluid is performed after the glass sheet has been washed or rinsed.

According to a twelfth aspect, there is provided the method of any one of aspects 1 to 11, wherein the step of ejecting fluid is performed before the glass sheet has been rinsed, dried, or bubble jetted.

According to a thirteenth aspect, there is provided a method of producing a glass substrate for a flat panel display, comprising producing a ribbon of glass, cutting a sheet from the ribbon, and cleaning particles from the sheet according to the method of any one of aspects 1 to 12.

According to a fourteenth aspect, there is provided an apparatus, for cleaning particles from a glass sheet, comprising:

a conveyor for supporting the glass sheet;

a conveyance plane, disposed adjacent the conveyor, wherein when the glass sheet is conveyed by the conveyor, a major surface of the glass sheet is disposed in the conveyance plane;

a nozzle having a longitudinal axis, wherein the longitudinal axis is disposed at an angle of 30 to 90 degrees with respect to the conveyance plane, and the nozzle is disposed at a distance of less than or equal to 100 mm from the conveyance plane.

According to a fifteenth aspect, there is provided the apparatus of aspect 14, further wherein the nozzle has an orifice, and the orifice has a diameter ranging from 0.2 to 1.0 mm.

According to a sixteenth aspect, there is provided the apparatus of any one of aspects 14 to 15, further comprising a plurality of the nozzles, wherein the plurality of the nozzles is disposed in two banks, wherein the banks are disposed at an angle of 30 to 150 degrees with respect to one another, wherein the conveyor is configured to convey the glass sheet in a conveyance direction, and a centerline of the banks is aligned with or parallel to the conveyance direction.

According to a seventeenth aspect, there is provided the apparatus of any one of aspects 14 to 15, further comprising a plurality of the nozzles, wherein the plurality of the nozzles is disposed in a bank, wherein the conveyor is configured to convey the glass sheet in a conveyance direction, and wherein the bank is disposed at an angle of 15 to 75 degrees with respect to a line that is perpendicular to the conveyance direction.

According to an eighteenth aspect, there is provided the apparatus of any one of aspects 14 to 17, wherein the nozzle is configured to eject fluid having a fan angle of 30 to 90 degrees.

According to a nineteenth aspect, there is provided the apparatus of any one of aspects 14 to 18, wherein the nozzle further comprises a fillister.

According to a twentieth aspect, there is provided the apparatus of any one of aspects 14 to 19, further comprising a plurality of the nozzles, wherein the plurality of the nozzles is disposed in two banks, and wherein the banks are disposed on opposite sides of the conveyance plane.

According to a twenty first aspect, there is provided the apparatus of any one of aspects 14 to 19, further comprising a sheet support disposed on a side of the conveyance plane opposite to that on which the nozzle is disposed.

DETAILED DESCRIPTION

Figure 1:
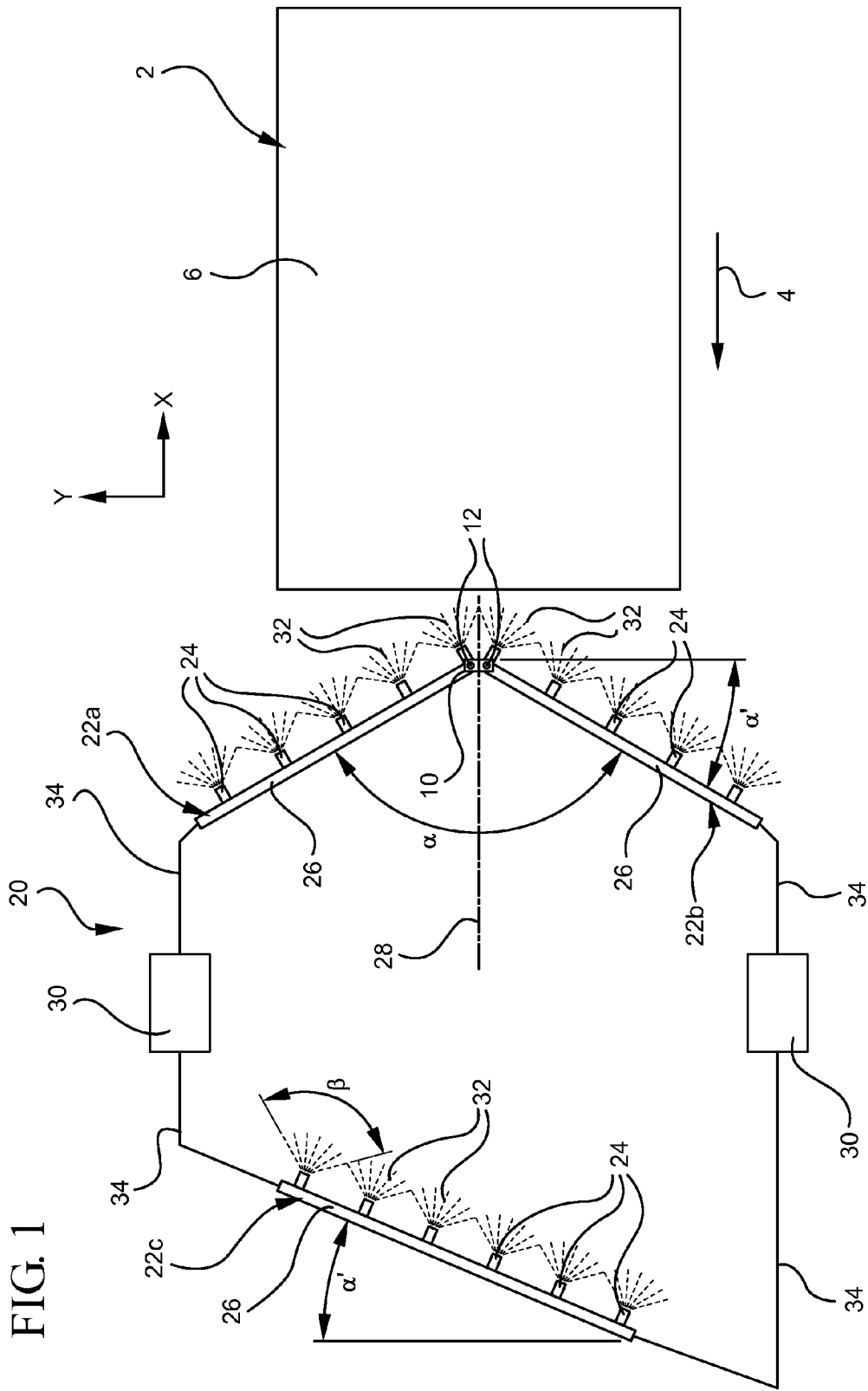
FIG. 1 is a schematic top view of a fluid applicator and glass sheet according to one embodiment.

In the following detailed description, by way of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

The present disclosure sets forth an apparatus and method that can effectively clean small particles, i.e., on the order of 1 to 50 µm, from the surface of a glass sheet that has a thickness of less than or equal to 1.2 mm. The inventors have found that small particles very strongly adhere to the glass surface, but can effectively be cleaned from the glass surface—without increasing the risk of scratching the glass—by carefully controlling a number of fluid-nozzle operating parameters, including: fluid pressure; flow rate; nozzle injecting angle; and distance between the injecting nozzle and the surface of the glass sheet.

One, non-limiting, embodiment of a fluid applicator 20 is shown in FIGS. 1-5. The fluid applicator 20 includes nozzle banks 22 that are in fluid communication with one or more fluid sources 30 to apply fluid 32 to the glass sheet 2.

The glass sheet 2 has major surfaces 6, and a thickness 8. The thickness 8 may be, for example, 1.2 mm or less. The glass sheet 2 moves relative to the fluid applicator 20 in the direction of arrow 4. The glass sheet 2 may move relative to the fluid applicator 20 at a rate of about 4 to about 6 meters per minute. As the rate becomes faster than about 6 meters per minute, it becomes difficult to achieve the level of cleanliness desired. As the rate becomes slower than 4 meters per minute, the process throughput becomes too low for ordinary manufacturing lines to be economical. The glass sheet 2 may be conveyed by any conventional conveyance device as known in the art, and may be conveyed so that the X-Y plane as shown throughout the figures corresponds to either vertical, horizontal, or a plane oblique to vertical. However, for consistency and ease of explanation, FIGS. 1-5 are described as if the X-Y plane corresponds to the horizontal.

The fluid 32 may be deionized water, water, water having a detergent, or other suitable fluid. Each of the fluid sources 30 may include a fluid supply or reservoir, and a pump or other pressurization device, as well as appropriate regulating and controlling devices, to provide fluid 32 to the nozzles 24 at a desired pressure and flow rate, as would be understood by one of ordinary skill in the art. The fluid sources 30 may be controlled to apply the same, or different, flow rates and pressures to different nozzle banks 22.

Each nozzle bank 22 includes one or more nozzles 24 coupled to a pipe 26. The pipe 26 is in fluid communication with the fluid source 30 via connection lines 34. The number of nozzles 24 in any one bank 22 is not particularly limited, and may suitably be chosen based on other parameters of the fluid applicator 20, for example, number and size of nozzle banks 22, configuration of nozzle banks including positional relationship to one another, and desired coverage area as based on size of the glass sheet 2, and/or based on parameters of the nozzles themselves 24, for example, fan angle β and distance 21 from the surface 6, as described below. Additionally, it is not necessary that each nozzle bank 22 have the same number of nozzles.

The nozzle banks 22 of any particular fluid applicator 20 may take on various configurations. As shown in FIG. 1, one embodiment includes two nozzle banks 22a, 22b that are hinged together to form a V-shape, and a separately-placed third nozzle bank 22c. The nozzle banks 22a, 22b are coupled to connector 10 by fasteners 12, which may be, for example, bolts, screws, or pins. The fasteners 12 and connector 10 allow the nozzle banks 22a, 22b to be pivoted so that an angle α between them may be suitably changed. As shown, nozzle banks 22a, 22b are symmetrically disposed about a centerline 28 that is aligned with a central longitudinal axis of glass sheet 2, although this need not be the case. That is, centerline 28, when viewed in a direction along the Z axis, need not be aligned with the central longitudinal axis of glass sheet 2, but instead may be either parallel to and offset from the central longitudinal axis, or may be disposed at an angle thereto. Similarly, each nozzle bank 22a, 22b need not be symmetrically disposed relative to the centerline 28, but may be disposed at a different angle relative thereto. When the centerline 28 is aligned with the central longitudinal axis of glass sheet 2, and the nozzle banks 22a, 22b are symmetrically arranged about the centerline, the angle α may be from about 30 to about 150 degrees, and may depend upon: the size of the glass sheet 2 to be cleaned; the length of the nozzle banks 22a, 22b; and the number of nozzles 24 in each bank 22. Correspondingly, the angle α', between nozzle bank 22b and a line perpendicular to the direction 4, may be from about 75 to about 15 degrees (for example, 75, 65, 55, 45, 35, 25, or 15, degrees). Each nozzle bank 22a, 22b is shown as being connected to one fluid source 30, but may be connected to more than one if so desired. Additionally, as shown, the nozzle banks 22a, 22b do not have their pipes 26 in direct fluid communication with one another, but they could if so desired. The third nozzle bank 22c is connected to two fluid sources 30, one on each end of pipe 26, but may be connected to only one fluid source 30 if so desired. Similarly to nozzle bank 22b, the nozzle bank 22c may be disposed at an angle α' of about 75 to about 15 degrees, relative to a line that is perpendicular to the direction 4 (for example, 75, 65, 55, 45, 35, 25, or 15, degrees).

Next, the configuration and arrangement of the nozzles 24 will be described with respect to FIGS. 2-5.

Figure 2:
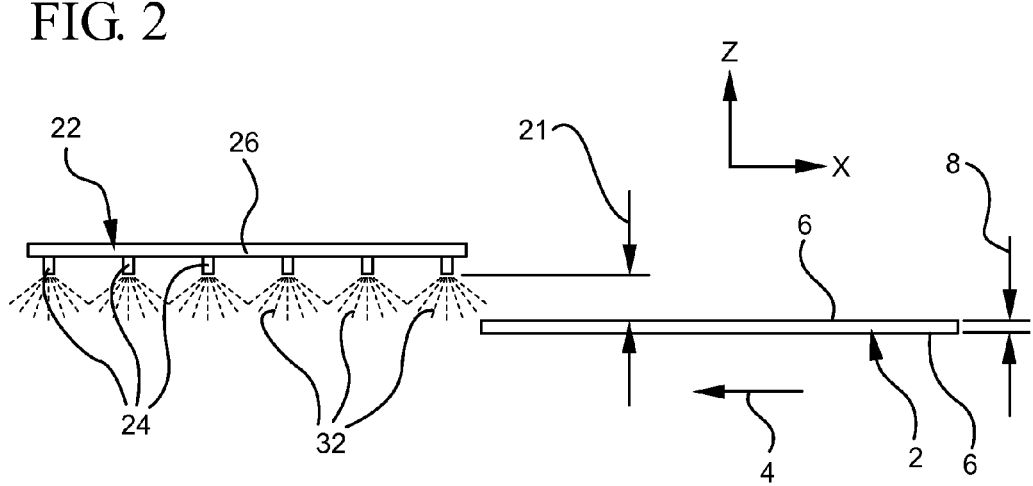
FIG. 2 is a schematic side view of a portion of the fluid applicator and glass sheet as shown in FIG. 1.

As shown in FIG. 2, the nozzles 24 are disposed at a distance 21 from the surface 6 of the glass sheet 2, and have a fan angle β. The nozzles 24 may be configured so as to have a fan angle β of about 30 to about 90 degrees (for example, 30, 35, 45, 55, 65, 75, 85, or 90 degrees), or alternatively of about 45 to about 90 degrees (for example, 50, 60, 70, 80, or 90 degrees). In general, the larger the angle β, the larger the surface cleaning area a nozzle will cover and, hence, the smaller the total number of nozzles 24 required for a given nozzle bank 22. However, for a given fluid pressure and flow rate, a larger spray angle β has a disadvantage of delivering lesser impact to the particles adhered to the surface 6 of glass sheet 2.

Figure 3:
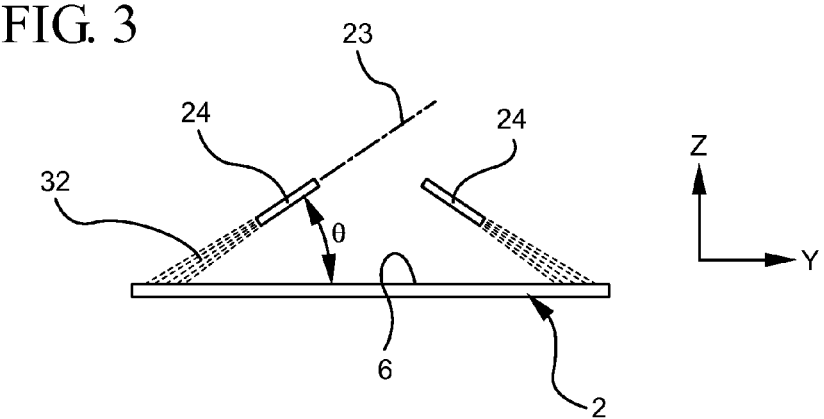
FIG. 3 is a schematic front view of a portion of the fluid applicator and glass sheet as shown in FIG. 1.

As shown in FIG. 3, each nozzle 24 has a longitudinal axis 23 that is disposed at an angle θ with respect to the surface 6 of the glass sheet 2.

Figure 4:
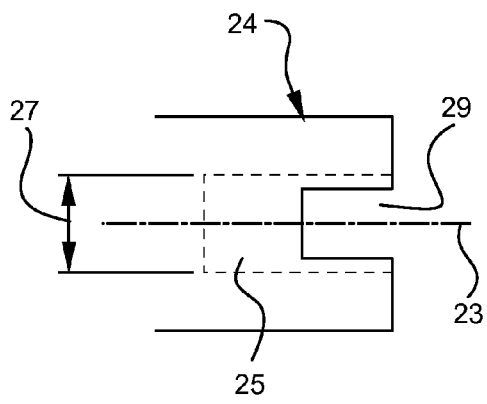
FIG. 4 is a blown-up schematic side view of a nozzle.
Figure 5:
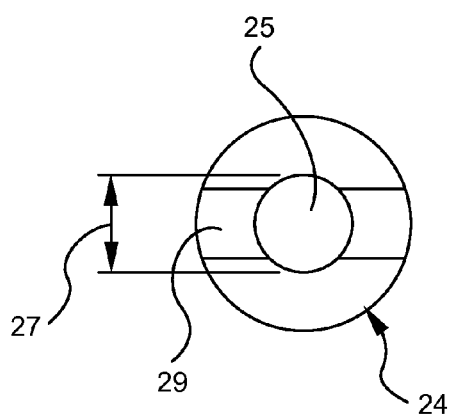
FIG. 5 is a blown-up schematic front end view of a nozzle.

As shown in FIGS. 4 and 5, each nozzle 24 has an orifice 25 that has a diameter 27. The nozzle diameter 27 may be from about 0.2 to about 1.0 mm (for example, 0.2, 0.3, 0.4, 0.5, 0.6, 0.7, 0.8, 0.9, or 1.0, mm). As the nozzle diameter 27 increases beyond about 1.0 mm, the pressure from the nozzle 24 becomes too low, for a given flow rate, to achieve acceptable particle removal. Similarly, if a desired pressure is achieved at nozzle diameters beyond about 1.0 mm, the flow rate of the fluid becomes too high causing unnecessary waste of fluid. On the other hand, if the nozzle diameter 27 is decreased below about 0.2 mm, the fluid spray would turn mist-like, reducing the impact pressure on the glass surface thereby reducing the particle removal effect. Another nozzle diameter range is from about 0.3 to about 0.7 mm. A further nozzle diameter range is from about 0.4 to about 0.5 mm. Lastly, with respect to nozzle arrangement, each nozzle 24 has a fillister 29 to flatten the spray of fluid 32.

The fluid applicator 20 may be setup and operated to effectively remove small particles, i.e., on the order of 1 to 50 μm, from the surfaces 6 of the glass sheet 2 by carefully controlling a number of nozzle parameters, including: fluid pressure; flow rate; nozzle injecting angle θ; and distance 21 between the nozzle 24 and the surface 6 of the glass sheet 2.

Fluid Pressure. As noted above, it has been found that a relatively high fluid pressure (relative to prior glass rinsing processes) is desirable to clean small particles, i.e., on the order of 1 to 50 μm from the surface 6 of the glass sheet 2. Here, fluid pressure is that existing at the orifice 25 of each nozzle 24. For example, the fluid pressure may be from about 10 to about 80 kg/cm². When the fluid pressure is less than about 10 kg/cm², there is insufficient pressure to remove small particles. For example, typical fluid supply pressures available in a plant are around 3 kg/cm², and are insufficient to remove small particles from the surface 6 of a glass sheet 2. Thus, a pump may be used to increase the pressure at the nozzle 24 to at least about 10 kg/cm², or about 20 kg/cm², or about 30 kg/cm², or about 40 kg/cm², or about 50 kg/cm², or about 60 kg/cm², or about 70 kg/cm², or about 80 kg/cm². When the fluid pressure increases beyond about 80 kg/cm², it may cause excessive force on the particles to the point where they may scratch the surface 6.

Flow Rate. Flow rate is highly dependent on a number of factors, for example: number of nozzles 24; nozzle diameter 27; pressure of the fluid supplied to the nozzle 24; and glass conveyance speed. In general, the higher any one of these three parameters is, the higher the fluid flow rate, assuming all other factors are equal. In general, the larger the nozzle diameter, the larger the flow rate per nozzle. For example, for a nozzle with an orifice diameter of from 0.3 mm to 0.5 mm, preferably about 0.4 mm, the flow rate desirably is from about 1 to about 5 liters per minute (for example, 1, 2, 3, 4, or 5, liters per minute). For example, for a nozzle with an orifice diameter of from 0.9 mm to 1.1 mm, preferably 1.0 mm, the flow rate desirably is from about 3 to about 20 liters per minute (for example 3, 4, 5, 6, 7, 8, 9, 10, 11, 12, 13, 14, 15, 16, 17, 18, 19, or 20, liters per minute), or alternatively from about 3 to about 10 liters per minute (for example, 3, 4, 5, 6, 7, 8, 9, or 10, liters per minute). With the above-noted fluid pressure range of from about 10 to about 80 kg/cm², the flow rate is desirably from about 1 to about 20 liters per minute (for example, 1, 2, 3, 4, 5, 6, 7, 8, 9, 10, 11, 12, 13, 14, 15, 16, 17, 18, 19, or 20, liters per minute).

Nozzle Injecting Angle θ. In general, the nozzle injecting angle θ is an acute or right angle because the glass sheet 2 constantly moves in a conveyance direction 4 relative to the nozzles 24, and this angle range pushes the particles against the conveyance direction 4 so that they may be effectively removed from the surface 6 of the sheet 2. Desirably, the angle θ is from about 30 degrees to 90 degrees (for example, 30, 40, 50, 60, 70, 80, or 90, degrees). If the angle θ is greater than 90 degrees, then the nozzles 24 would at least partly push the particles in the same direction as the conveyance direction, whereby the particles may not be removed from the surface 6. On the other hand, as angle θ becomes less than about 30 degrees, the resistance of the fluid against the sheet too greatly impedes the movement of the sheet 2 in the conveyance direction 4; in fact the resistance may become so great that the sheet 2 may be stopped from movement altogether, which is especially true as the pressure increases above 10 kg/cm². In other cases, the angle θ desirably is from about 45 degrees to 90 degrees (for example, 45, 55, 65, 75, 85, or 90, degrees).

Distance 21 between the nozzle 24 and the surface 6 of the glass sheet 2. The distance 21 desirably is less than or equal to 100 mm. Another desirable range is from about 10 mm to about 100 mm (for example, 10, 20, 30, 40, 50, 60, 70, 80, 90, or 100, mm). As the distance 21 is increased beyond 100 mm, the pressure of the fluid jet in contact with the glass surface decays quickly, thereby jeopardizing particle cleaning capability. On the other hand, in order to achieve sufficient width of per nozzle coverage on the surface 6, the height is desirably greater than or equal to 10 mm.

The above-discussed nozzle parameters, including nozzle orifice diameter 27, flow rate, pressure, fan angle β, nozzle angle θ with respect to surface 6, and distance 21, may either be the same, or may differ, for the nozzles in any one particular nozzle bank 22. Similarly, even if all the nozzles 24 in any one bank 22 have the same parameters, those parameters may differ from nozzle bank to nozzle bank. For example, one desirable arrangement is one in which the nozzles in banks 22a, 22b have a lower pressure and higher flow than the nozzles in bank 22c. Generally, it is not necessary for both the nozzle banks 22a, 22b and the nozzle bank 22c to all apply fluid so as to clean small particles from surface 6; the number and arrangement of nozzle banks may be chosen selectively so as to clean small particles from the desired portion, including all, of the area of surface 6.

Figure 6:
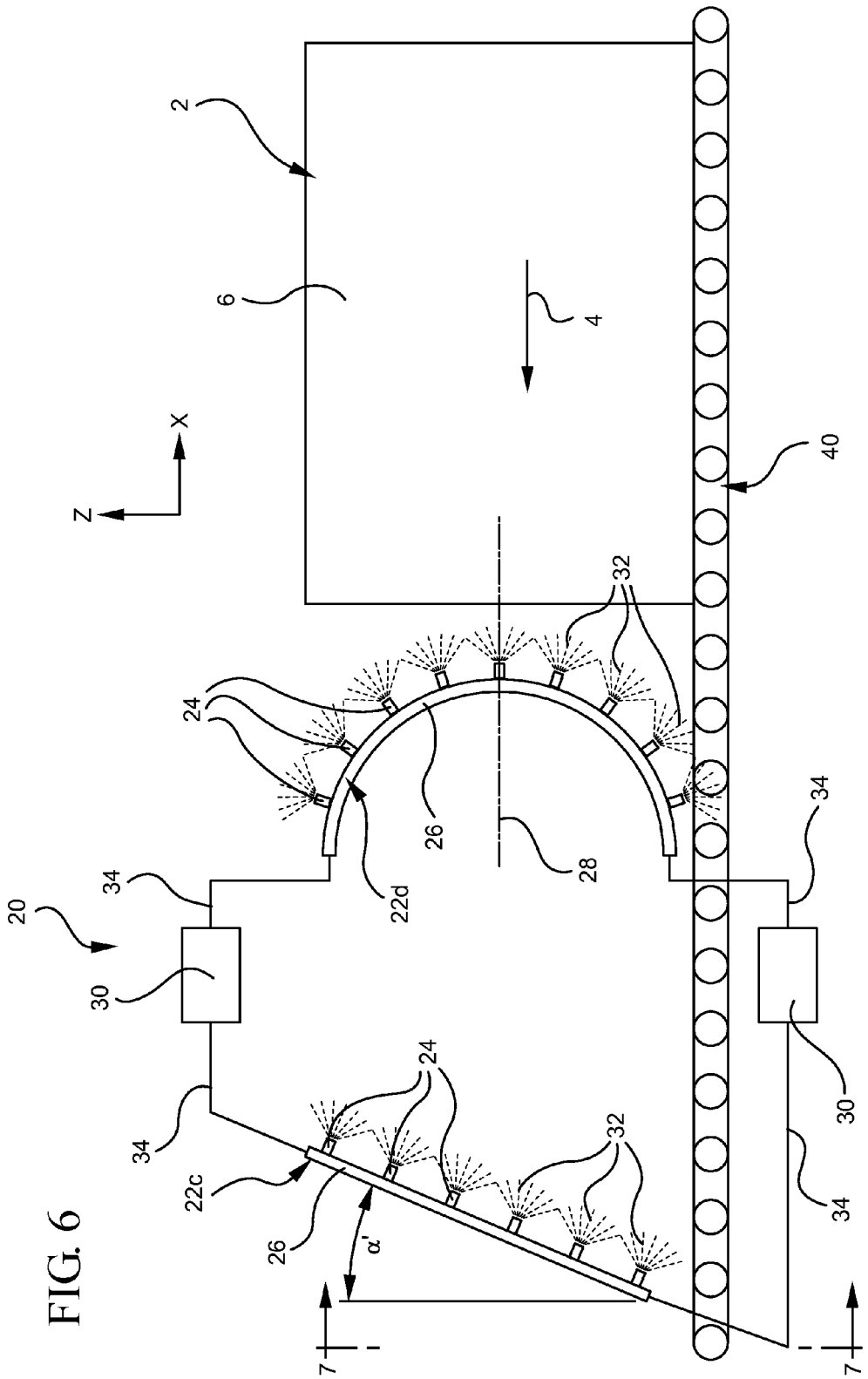
FIG. 6 is schematic side view of a fluid applicator and glass sheet according to a second embodiment.

A second exemplary embodiment will be explained with reference to FIGS. 6 and 7. Similarly to the first embodiment, although shown in a vertical arrangement, the glass sheet 2 may be conveyed by any conventional conveyance device as known in the art, and may be conveyed so that the X-Y plane as shown throughout the figures corresponds to either vertical, horizontal, or a plane oblique to vertical. The second embodiment includes many of the same elements and features as set forth in connection with the first embodiment. Thus, like reference numerals will be used for like elements, and mainly the differences from the first embodiment will be described in detail. As shown in FIG. 6, the fluid applicator 20 includes two nozzle banks 22c, 22d connected to fluid sources 30 to apply fluid 32 to a glass sheet 2. The glass sheet 2 is conveyed by a conveyor 40.

Nozzle bank 22d is formed in a generally U-shape having a centerline 28. As with the first embodiment, when viewed in a direction along the Z axes, the centerline 28 may be aligned with, parallel but offset from, or at an angle with respect to, the longitudinal axis of the glass sheet 2. The U-shaped nozzle bank 22d is shown as being connected to two fluid sources 30, i.e., one on each end of pipe 26, although such need not be the case; instead, the pipe 26 could be sealed at one end (or both ends) and coupled to only one fluid source 30 either at one of its ends or at any point therebetween. The nozzle bank 22d may be such that the pipe 26 has a continuous lumen from one end to the other with equal pressures applied by both fluid sources 30, or may be sealed at a point along its length so as to prevent fluid from one fluid source 30 from contacting within the pipe 26 with fluid from the other fluid source 30. Although shown as a symmetrical circular arc, the nozzle bank 22d need not be. That is, the nozzle bank 22d need not be symmetrical about centerline 28. Similarly, the nozzle bank 22d need not be a circular arc, but may instead include any desired or suitable shape or part thereof, for example, elliptical, strict U-shape having arms straight, a U-shape with arms bent outward, or a part of an arc of any shape. Additionally, although shown as a continuous, pipe 26 may be pivoted, or have a flexible section, at any point over its length so that the portions of the nozzle bank 26 may be movable relative to one another.

The nozzle bank 22c is similar to that as shown and described in connection with the first embodiment and, therefore, will not be further described here. Again, as noted above, the number and arrangement of nozzle banks 22 can be chosen to provide suitable coverage over the surface 6. For example, nozzle bank 22d alone may be used, as may nozzle bank 22c, to apply fluid so as to clean small particles from the surface 6. Additionally, nozzle bank 22d may be used as a relatively low pressure rinse (or wash) whereas nozzle bank 22c may be used to clean small particles from surface 6, or vice versa. Similarly, although the glass sheet is shown as encountering nozzle bank 22d prior to nozzle bank 22c, the order of the nozzle banks may be reversed. Further, for example, either nozzle bank 22c, 22d, may be used without the other to clean small particles from surface 6.

The conveyor 40 supports an edge of the glass sheet 2 in order to move the glass sheet 2 in the conveyance direction 4. The surfaces 6 of the glass sheet 4 may be supported in any manner, including a non-contact manner, by any suitable method and apparatus know in the art so as to guide the sheet 2 as it is being conveyed toward and through the fluid applicator 20. Although shown as a conveyor belt and rollers, the conveyor 40 may take any suitable configuration as known in the art.

Figure 7:
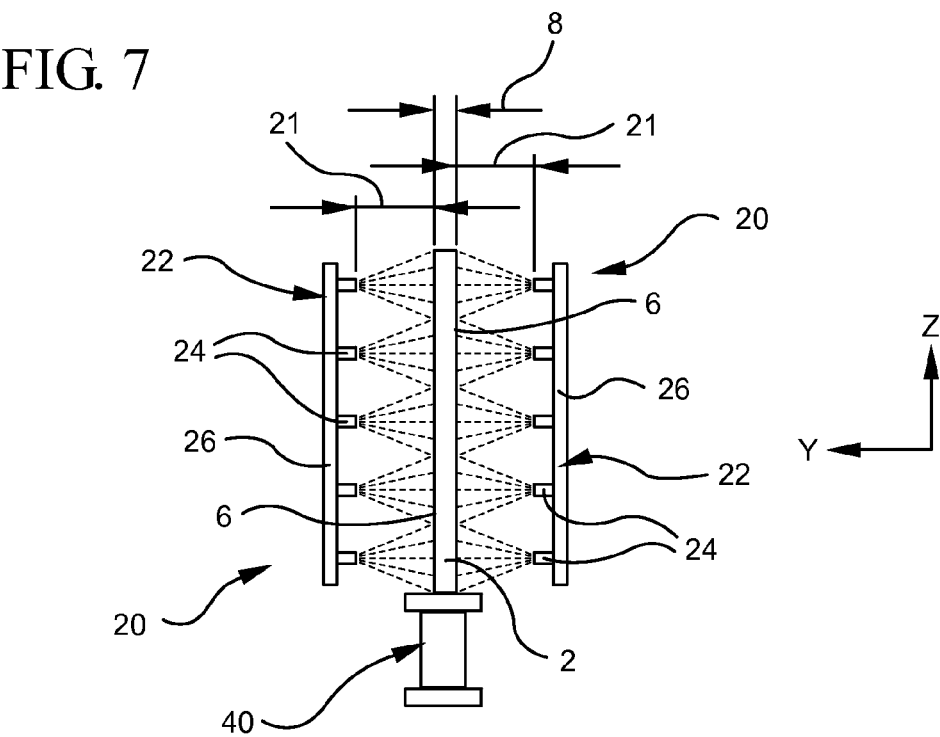
FIG. 7 is a partial cross-sectional view of the fluid applicator of FIG. 6 as taken along the line 7-7.

As shown in FIG. 7, fluid applicators 20 are disposed on opposite sides of the glass sheet 2 so that both surfaces 6 may have small particles cleaned therefrom. The set up and operation of the fluid applicator 20 (including number and configuration of nozzle banks, as well as numbers of nozzles and nozzle parameters) on each side of the glass sheet 2 is advantageously the same, so as to balance pressures on each side of the glass sheet 2. However, strictly speaking, the set up and operation of the fluid applicators 20 need not be the same on each side of the glass sheet 2.

A third exemplary embodiment will be explained with references to FIGS. 6 and 8. Similarly to the first embodiment, although shown in a vertical arrangement, the glass sheet 2 may be conveyed by any conventional conveyance device as known in the art, and may be conveyed so that the X-Y plane as shown throughout the figures corresponds to either vertical, horizontal, or a plane oblique to vertical. The third embodiment includes many of the same elements and features as set forth in connection with the first and second embodiments. Thus, like reference numerals will be used for like elements, and mainly the differences from the first and second embodiments will be described in detail.

Figure 8:
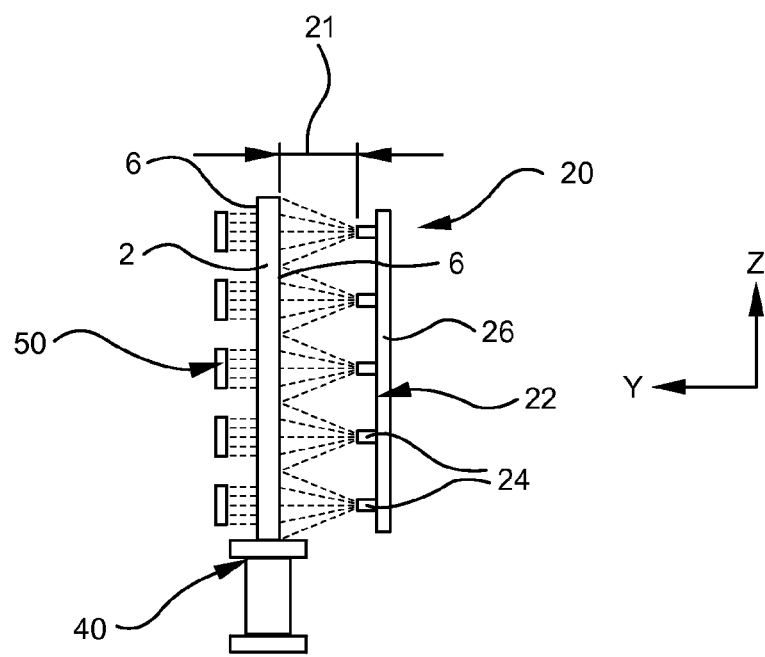
FIG. 8 is a partial cross sectional view similar to that of FIG. 7, but according to an alternate embodiment.

FIG. 8 is a view similar to FIG. 7, but instead of fluid applicators 20 on both sides of the glass sheet 20, one side of the glass sheet 2 is supported by a sheet support 50. As shown, the sheet support 50 may include a non-contact device which may be, for example, a fluid bearing, an air bearing, or a pressure-vacuum table, as are know in the art. On the other hand, the sheet support 50 may also include a type of support that contacts the glass sheet 2, for example a series of rollers.

Figure 9:
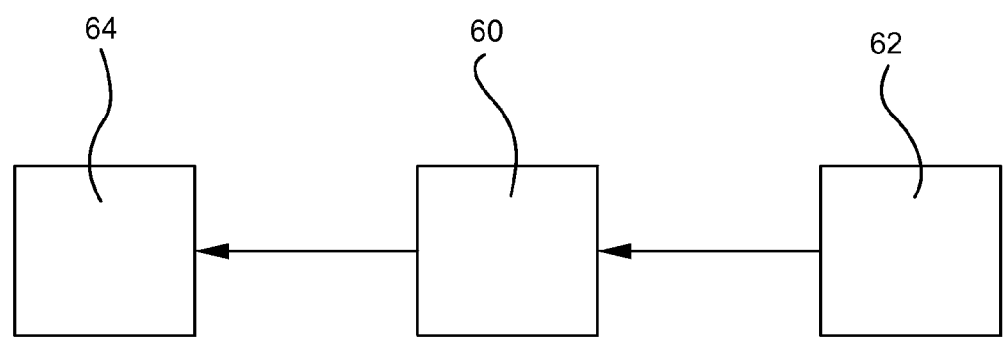
FIG. 9 is a flow chart of an arrangement for a glass cleaning process.

The fluid applicator 20, including any of the embodiments described above, may be used in various places within a glass sheet finishing process. With reference to FIG. 9, a glass finishing process may include three steps 60, 62, 64, wherein the glass sheet 2 proceeds from step 62 to step 60, and then to step 64. Although shown as one step immediately following the prior step, such need not be the case. That is, there may be other steps between the steps 60, 62, 64, as well as prior or subsequent to the sequence of steps 60, 62, 64. The fluid applicator 20 may be used at process step 60, which may be a loading buffer zone prior to a final rinse step, or a final rinse step, to clean small particles off of glass sheet 2. A prior step 62 may include, for example, washing, rinsing, and/or bubble jetting. A subsequent step 64 may include, for example, rinsing, bubble jetting, and/or drying. Step 60 may advantageously be used immediately prior to another process zone wherein there is relatively equal pressure between the zones so as to reduce the possibility that the fluid used to clean small particles from the surface 6 will contaminate the subsequent process zone. For example, if subsequent step 64 is a low pressure rinse immediately following step 60, then the low pressure rinse zone may attract particles cleaned from the glass sheet 2 in process step 60 back onto the glass sheet 2. On the other hand, if subsequent step 64 is a process step in a zone of relatively equal pressure as in the zone of process step 60, or there is pressure compensation between the zones in steps 60 and 64, then there is less likelihood of re-contamination by particles cleaned off of the glass sheet 2 in process step 60.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the description uses the term "glass sheet", the method and apparatus of the present invention may be applied to other objects having a similar thickness, fragility, and cleanliness requirement, as the glass sheet described above.

Also, for example, although two-sided arrangements were described in connection with FIGS. 6-8, similar two-sided arrangements may be used in connection with the embodiment of FIG. 1. Similarly, although a conveyor 40 was described in connection with FIG. 6, such an arrangement may also be used in connection with the embodiment of FIG. 1.

What is claimed is:

1. Method of cleaning particles from a glass sheet, comprising:
supporting a glass sheet;
ejecting fluid from a nozzle toward the glass sheet, wherein the fluid is delivered to the nozzle at a pressure of 10 to 80 kg/cm$^2$ and a flow rate of from 1 to 20 l/min; and
causing relative movement between the glass sheet and the nozzle in a conveyance direction, wherein the relative movement causes the glass sheet to move relative to the nozzle at a conveying speed of 4 to 6 m/min; and
further comprising a plurality of the nozzles, wherein the plurality of the nozzles is disposed in two banks, wherein the banks are disposed at an angle of 30 to 150 degrees with respect to one another, and wherein a centerline of the banks is aligned with or parallel to the conveyance direction, and further comprising ejecting fluid from the plurality of nozzles so that the nozzles in one of the two banks eject fluid on one side of and away from the centerline, and so that the nozzles in the other one of the two banks eject fluid on a side of the centerline opposite to the one side, and so that the nozzles in the other one of the two banks eject fluid away from the centerline.

2. The method of claim 1, wherein the nozzle is disposed at a distance of less than 100 mm from the glass sheet.

3. The method of claim 1, wherein the glass sheet is less than 1.2 mm thick.

4. The method of claim 1, wherein the nozzle has an orifice, and the orifice diameter is 0.2 to 1.0 mm.

5. The method of claim 1, wherein:
when the orifice diameter is from 0.3 mm to 0.5 mm, the flow rate is 1 to 5 l/min; and
when the orifice diameter is from 0.9 mm to 1.1 mm, the flow rate is 3 to 20 l/min.

6. The method of claim 1, wherein:
the fluid ejected from the nozzle forms a fan angle of 30 to 90 degrees; and
the fluid ejected from the nozzle has an angle of inclination of 30-90 degrees with respect to the glass sheet.

7. The method of claim 1, further comprising a plurality of the nozzles, wherein the plurality of the nozzles is disposed in a bank, and wherein the bank is disposed at an angle of 15 to 75 degrees with respect to a line that is perpendicular to the conveyance direction, and further wherein the line is in a plane parallel to that of a major surface of the glass sheet.

8. The method of claim 1, wherein the fluid is deionized water.

9. A method of producing a glass substrate for a flat panel display, comprising producing a ribbon of glass, cutting a sheet from the ribbon, and cleaning particles from the sheet according to the method of claim 1.

10. An apparatus, for cleaning particles from a glass sheet, comprising:
- a conveyor for supporting the glass sheet;
- a conveyance plane, disposed adjacent the conveyor, wherein when the glass sheet is conveyed by the conveyor, a major surface of the glass sheet is disposed in the conveyance plane;
- a nozzle having a longitudinal axis, wherein the longitudinal axis is disposed at an angle of 30 to 90 degrees with respect to the conveyance plane, the nozzle has an orifice, and the orifice has a diameter ranging from 0.2 to 1.0 mm, the nozzle is disposed at a distance of less than or equal to 100 mm from the conveyance plane, and the nozzle is configured to eject fluid having a fan angle of 30 to 90 degrees; and
- further comprising a plurality of the nozzles, wherein the plurality of the nozzles is disposed in two banks, wherein the banks are disposed at an angle of 30 to 150 degrees with respect to one another, wherein the conveyor is configured to convey the glass sheet in a conveyance direction, and a centerline of the banks is aligned with or parallel to the conveyance direction, and further wherein the nozzles are oriented so that the nozzles in one of the two banks will eject fluid on one side of and away from the centerline, and so that the nozzles in the other one of the two banks will eject fluid on a side of the centerline opposite to the one side, and so that the nozzles in the other one of the two banks will eject fluid away from the centerline.

11. The apparatus of claim 10, further comprising a plurality of the nozzles, wherein the plurality of the nozzles is disposed in a bank, wherein the conveyor is configured to convey the glass sheet in a conveyance direction, and wherein the bank is disposed at an angle of 15 to 75 degrees with respect to a line that is perpendicular to the conveyance direction, and further wherein the line is in a plane parallel to that of a major surface of the glass sheet.

12. The apparatus of claim 10, wherein the nozzle further comprises a fillister.

13. The apparatus of claim 10, further comprising a plurality of the nozzles, wherein the plurality of the nozzles is disposed in two banks, and wherein the banks are disposed on opposite sides of the conveyance plane.

14. Method of cleaning particles from a glass sheet, comprising:
- supporting a glass sheet;
- ejecting fluid from a nozzle toward the glass sheet, wherein the fluid is delivered to the nozzle at a pressure of 10 to 80 kg/cm$^2$ and a flow rate of from 1 to 20 l/min, wherein the nozzle is disposed at a distance of less than 100 mm from the glass sheet, wherein the nozzle has an orifice, and the orifice diameter is 0.2 to 1.0 mm, wherein the fluid ejected from the nozzle forms a fan angle of 30 to 90 degrees, and wherein the fluid ejected from the nozzle has an angle of inclination of 30-90 degrees with respect to the glass sheet; and
- causing relative movement between the glass sheet and the nozzle in a conveyance direction, wherein the relative movement causes the glass sheet to move relative to the nozzle at a conveying speed of 4 to 6 m/min; and
- further comprising a plurality of the nozzles, wherein the plurality of the nozzles is disposed in two banks, wherein the banks are disposed at an angle of 30 to 150 degrees with respect to one another, and wherein a centerline of the banks is aligned with or parallel to the conveyance direction, and further comprising ejecting fluid from the plurality of nozzles so that the nozzles in one of the two banks eject fluid on one side of and away from the centerline, and so that the nozzles in the other one of the two banks eject fluid on a side of the centerline opposite to the one side, and so that the nozzles in the other one of the two banks eject fluid away from the centerline.

\* \* \* \* \*